(12) United States Patent
Shin et al.

(10) Patent No.: US 12,312,652 B2
(45) Date of Patent: *May 27, 2025

(54) MATERIAL FOR HOT STAMPING AND METHOD OF MANUFACTURING THE SAME

(71) Applicant: Hyundai Steel Company, Incheon (KR)

(72) Inventors: Nu Ri Shin, Incheon (KR); Hun Chul Kang, Incheon (KR); Ji Hee Son, Incheon (KR); Byoung Hoon Kim, Incheon (KR)

(73) Assignee: Hyundai Steel Company, Incheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,459

(22) Filed: Feb. 28, 2023

(65) Prior Publication Data

US 2023/0227932 A1 Jul. 20, 2023

Related U.S. Application Data

(63) Continuation of application No. PCT/KR2021/007158, filed on Jun. 8, 2021.

(30) Foreign Application Priority Data

Sep. 1, 2020 (KR) .................. 10-2020-0111292
Apr. 1, 2021 (KR) .................. 10-2021-0042818

(51) Int. Cl.
*C21D 9/46* (2006.01)
*B21B 3/02* (2006.01)
(Continued)

(52) U.S. Cl.
CPC ............ *C21D 9/46* (2013.01); *B21B 3/02* (2013.01); *B21D 22/022* (2013.01); *C21D 6/002* (2013.01);
(Continued)

(58) Field of Classification Search
CPC ... B21B 3/003; C21D 2211/004; C21D 6/002; C21D 6/005; C21D 6/008; C21D 8/02;
(Continued)

(56) References Cited

U.S. PATENT DOCUMENTS 10,151,013 B2 12/2018 Oh et al.
11,326,226 B2 * 5/2022 Shin ................. C21D 6/002
(Continued)

FOREIGN PATENT DOCUMENTS

JP 2005-29870 A 2/2005
JP 2010-043323 A 2/2010
(Continued)

OTHER PUBLICATIONS

Notice of Non-Final Rejection in KR 20-111292 dated Jan. 4, 2021.
(Continued)

*Primary Examiner* — Jie Yang
(74) *Attorney, Agent, or Firm* — Fox Rothschild LLP

(57) ABSTRACT

Provided are a material for hot stamping, wherein the material includes: a steel sheet including carbon (C) in an amount of 0.19 wt % to 0.25 wt %, silicon (Si) in an amount of 0.1 wt % to 0.6 wt %, manganese (Mn) in an amount of 0.8 wt % to 1.6 wt %, phosphorus (P) in an amount less than or equal to 0.03 wt %, sulfur (S) in an amount less than or equal to 0.015 wt %, chromium (Cr) in an amount of 0.1 wt % to 0.6 wt %, boron (B) in an amount of 0.001 wt % to 0.005 wt %, an additive in an amount less than or equal to 0.1 wt %, balance iron (Fe), and other inevitable impurities; and fine precipitates distributed within the steel sheet. The additive includes at least one of titanium (Ti), niobium (Nb), and vanadium (V), and the fine precipitates include nitride or carbide of at least one of titanium (Ti), niobium (Nb), and vanadium (V) and trap hydrogen.

9 Claims, 5 Drawing Sheets

(51) Int. Cl.
*B21D 22/02* (2006.01)
*C21D 6/00* (2006.01)
*C21D 6/02* (2006.01)
*C21D 8/02* (2006.01)
*C22C 38/00* (2006.01)
*C22C 38/02* (2006.01)
*C22C 38/04* (2006.01)
*C22C 38/32* (2006.01)

(52) U.S. Cl.
CPC .............. *C21D 6/005* (2013.01); *C21D 6/008* (2013.01); *C21D 6/02* (2013.01); *C21D 8/0205* (2013.01); *C21D 8/0236* (2013.01); *C21D 8/0263* (2013.01); *C22C 38/002* (2013.01); *C22C 38/02* (2013.01); *C22C 38/04* (2013.01); *C22C 38/32* (2013.01); *C21D 2211/004* (2013.01); *C21D 2211/008* (2013.01)

(58) Field of Classification Search
CPC ...... C21D 8/0205; C21D 8/0226; C21D 9/46; C22C 38/002; C22C 38/02; C22C 38/04; C22C 38/24; C22C 38/26; C22C 38/28; C22C 38/32; C22C 38/38
See application file for complete search history.

(56) References Cited

U.S. PATENT DOCUMENTS

| | | |
|---|---|---|
| 11,390,929 B2 | 7/2022 | Yoo et al. |
| 11,535,916 B2 | 12/2022 | Fujita et al. |
| 2012/0227872 A1 | 9/2012 | Kim et al. |
| 2013/0340899 A1 | 12/2013 | Kusumi et al. |
| 2017/0145531 A1 | 5/2017 | Hayashi et al. |
| 2019/0062865 A1 | 2/2019 | Oh et al. |
| 2019/0270127 A1 | 9/2019 | Cho et al. |
| 2021/0147955 A1* | 5/2021 | Yoo .................. C21D 3/04 |
| 2022/0025498 A1 | 1/2022 | Suzuki et al. |
| 2022/0341012 A1 | 10/2022 | Seong et al. |

FOREIGN PATENT DOCUMENTS

| | | | |
|---|---|---|---|
| JP | 2010-047786 | A | 3/2010 |
| JP | 5126844 | B2 | 1/2013 |
| JP | 2014-118613 | A | 6/2014 |
| JP | 2017-529457 | A | 10/2017 |
| JP | 6525124 | B1 | 6/2019 |
| JP | 2021-155788 | A | 10/2021 |
| KR | 2011-0075319 | A | 7/2011 |
| KR | 2017-0076009 | A | 7/2017 |
| KR | 101848157 | B1 | 4/2018 |
| KR | 10-2018-0133508 | A | 12/2018 |
| KR | 2018-0133508 | A | 12/2018 |
| KR | 10-2019-0001226 | A | 1/2019 |
| KR | 10-2019-0001493 | A | 1/2019 |
| KR | 101938073 | B1 | 1/2019 |
| KR | 102031460 | B1 | 10/2019 |
| KR | 2020-0025841 | A | 3/2020 |
| KR | 10-2020-0036248 | A | 4/2020 |
| KR | 2020-0036248 | A | 4/2020 |
| KR | 102110679 | B1 | 5/2020 |
| KR | 2020-0061922 | A | 6/2020 |
| KR | 2020-0062926 | A | 6/2020 |
| RU | 2 466 210 | C2 | 11/2012 |
| RU | 2 469 102 | C2 | 12/2012 |
| RU | 2 557 114 | C2 | 7/2015 |
| RU | 2 587 106 | C2 | 6/2016 |
| WO | 2009/131233 | A1 | 10/2009 |
| WO | 2012/120692 | A1 | 9/2012 |
| WO | 2013/105631 | A1 | 7/2013 |
| WO | 2013/133270 | A1 | 9/2013 |
| WO | 2017/203994 | A1 | 11/2017 |
| WO | WO-2019004540 A1 * | | 1/2019 .............. B21B 3/02 |
| WO | 2020/111230 | A1 | 6/2020 |

OTHER PUBLICATIONS

Notice of Non-Final Rejection KR 21-42818 dated Sep. 5, 2022.
Notice of Non-Final Rejection in KR 21-64673 dated Dec. 2, 2021.
Rejection decision in KR 21-64673 dated Aug. 7, 2022.
Rejection Decision in KR 21-64673 dated Nov. 22, 2022.
Office Action issued Feb. 22, 2023 in corresponding Korean Patent Application No. 10-2021-0042818 (English translation provided).
Notification of Third Party Submission issued Apr. 15, 2022 in corresponding Korean Application No. 10-2021-0064673.
Notification of Third Party Submission issued May 9, 2022 in corresponding Korean Patent Application No. 1020210042818.
Office Action issued Sep. 27, 2023 issued in corresponding Russian Patent Application No. 2023104665.
Office Action issued Feb. 16, 2024 in corresponding Japense Patent Application No. 2023-512762 (English translation provided).
Extended European Search Report issued Dec. 13, 2024 in corresponding European Patent Application No. 21806608.2.

* cited by examiner

MATERIAL FOR HOT STAMPING AND METHOD OF MANUFACTURING THE SAME

CROSS-REFERENCES TO RELATED APPLICATIONS

This Application is a continuation application of PCT/KR2021/007158 filed Jun. 8, 2021, which claims priority of Korean Patent Applications 10-2020-0111292 filed on Sep. 1, 2020 and 10-2021-0042818 filed on Apr. 1, 2021. The entire contents of these applications are incorporated herein by reference in their entirety.

TECHNICAL FIELD

One or more exemplary embodiments relate to a material for hot stamping and a method of manufacturing the same, and more particularly, to a material for hot stamping, the material being capable of providing high-quality mechanical characteristics and hydrogen-delayed fracture characteristics to a hot stamping part, and a method of manufacturing the material.

BACKGROUND

High strength steel is used to manufacture light weight and strong parts for automobiles. High strength steel may provide high strength characteristics compared to the weight thereof. However, as the strength increases, press formability decreases, and thus, a material may break or a spring back phenomenon may occur during a manufacturing process. As a result, it is difficult to precisely form a product having a complex shape.

As a solution of addressing these issues, a hot stamping method has been used. As interest in this method increases, research on materials for hot stamping has been actively conducted. For example, as disclosed in the invention of Korean Application Publication 10-2017-0076009, a hot stamping method is a forming technology in which a boron steel sheet is heated to an appropriate temperature, formed in a press mold, and then rapidly cooled to manufacture a high-strength part. According to the invention of Korean Application Publication 10-2017-0076009, cracks, poor shape freezing, or the like occurring in a high-strength steel sheet during forming may be suppressed to thereby manufacture a part with high precision.

However, in the case of a hot stamping steel sheet, hydrogen-delayed fracture occurs due to hydrogen and residual stress introduced in a hot stamping process. Regarding this problem, Korean Application Publication 10-2020-0061922 discloses performing preheating before a hot stamping blank is heated to a high temperature to form a thin oxide layer on a surface of the blank, thereby blocking the inflow of hydrogen in a high temperature heating process to reduce hydrogen-delayed fracture. However, since it is impossible to completely block the inflow of hydrogen, introduced hydrogen may not be controlled, thereby leading to hydrogen-delayed fracture.

SUMMARY

One or more exemplary embodiments include a material for hot stamping, the material being capable of providing high-quality mechanical characteristics and hydrogen-delayed fracture characteristics to a hot stamping part, and a method of manufacturing the material. However, one or more embodiments are only example embodiments, and the scope of the disclosure is not limited by the example embodiments.

According to one aspect, a material for hot stamping includes: a steel sheet including carbon (C) in an amount of 0.19 wt % to 0.25 wt %, silicon (Si) in an amount of 0.1 wt % to 0.6 wt %, manganese (Mn) in an amount of 0.8 wt % to 1.6 wt %, phosphorus (P) in an amount less than or equal to 0.03 wt %, sulfur (S) in an amount less than or equal to 0.015 wt %, chromium (Cr) in an amount of 0.1 wt % to 0.6 wt %, boron (B) in an amount of 0.001 wt % to 0.005 wt %, an additive in an amount less than or equal to 0.1 wt %, balance iron (Fe), and other inevitable impurities; and fine precipitates distributed within the steel sheet. The additive includes at least one of titanium (Ti), niobium (Nb), and vanadium (V), and the fine precipitates include nitride or carbide of at least one of titanium (Ti), niobium (Nb), and vanadium (V) and trap hydrogen.

The fine precipitates may be formed in an amount greater than or equal to 7,000 pieces and less than or equal to 16,500 pieces per unit area 100 $\mu m^2$.

An amount greater than or equal to 60% of the fine precipitates may be formed to have a diameter less than or equal to 0.01 $\mu m$.

A number of fine precipitates having the diameter less than or equal to 0.01 $\mu m$ from among the fine precipitates may be greater than or equal to 4,500 and less than or equal to 16,000 per unit area 100 $\mu m^2$.

An amount greater than or equal to 25% of the fine precipitates may be formed to have a diameter less than or equal to 0.005 $\mu m$.

A mean distance between the fine precipitates may be greater than or equal to 0.4 $\mu m$ and less than or equal to 0.8 $\mu m$.

According to another aspect, a method of manufacturing a material for hot stamping includes: reheating a slab within a slab reheating temperature range of 1,200° C. to 1,250° C.; manufacturing a steel sheet by hot rolling the reheated slab within a finishing delivery temperature range of 840° C. to 920° C.; and coiling the steel sheet within a coiling temperature range of 700° C. to 780° C. and forming fine precipitates within the steel sheet, wherein the slab includes carbon (C) in an amount of 0.19 wt % to 0.25 wt %, silicon (Si) in an amount of 0.1 wt % to 0.6 wt %, manganese (Mn) in an amount of 0.8 wt % to 1.6 wt %, phosphorus (P) in an amount less than or equal to 0.03 wt %, sulfur (S) in an amount less than or equal to 0.015 wt %, chromium (Cr) in an amount of 0.1 wt % to 0.6 wt %, boron (B) in an amount of 0.001 wt % to 0.005 wt %, an additive in an amount less than or equal to 0.1 wt %, balance iron (Fe), and other inevitable impurities. The additive includes at least one of titanium (Ti), niobium (Nb), and vanadium (V), and the fine precipitates include nitride or carbide of at least one of titanium (Ti), niobium (Nb), and vanadium (V) and trap hydrogen.

The fine precipitates may be formed in an amount greater than or equal to 7,000 pieces and less than or equal to 16,500 pieces per unit area 100 $\mu m^2$.

An amount greater than or equal to 60% of the fine precipitates may be formed to have a diameter less than or equal to 0.01 $\mu m$.

A number of fine precipitates having the diameter less than or equal to 0.01 $\mu m$ from among the fine precipitates may be greater than or equal to 4,500 and less than or equal to 16,000 per unit area 100 $\mu m^2$.

An amount greater than or equal to 25% of the fine precipitates may be formed to have a diameter less than or equal to 0.005 μm.

A mean distance between the fine precipitates may be greater than or equal to 0.4 μm and less than or equal to 0.8 μm.

Other aspects, features, and advantages other than those described above will become apparent from the specific description, claims, and drawings for implementing the following disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
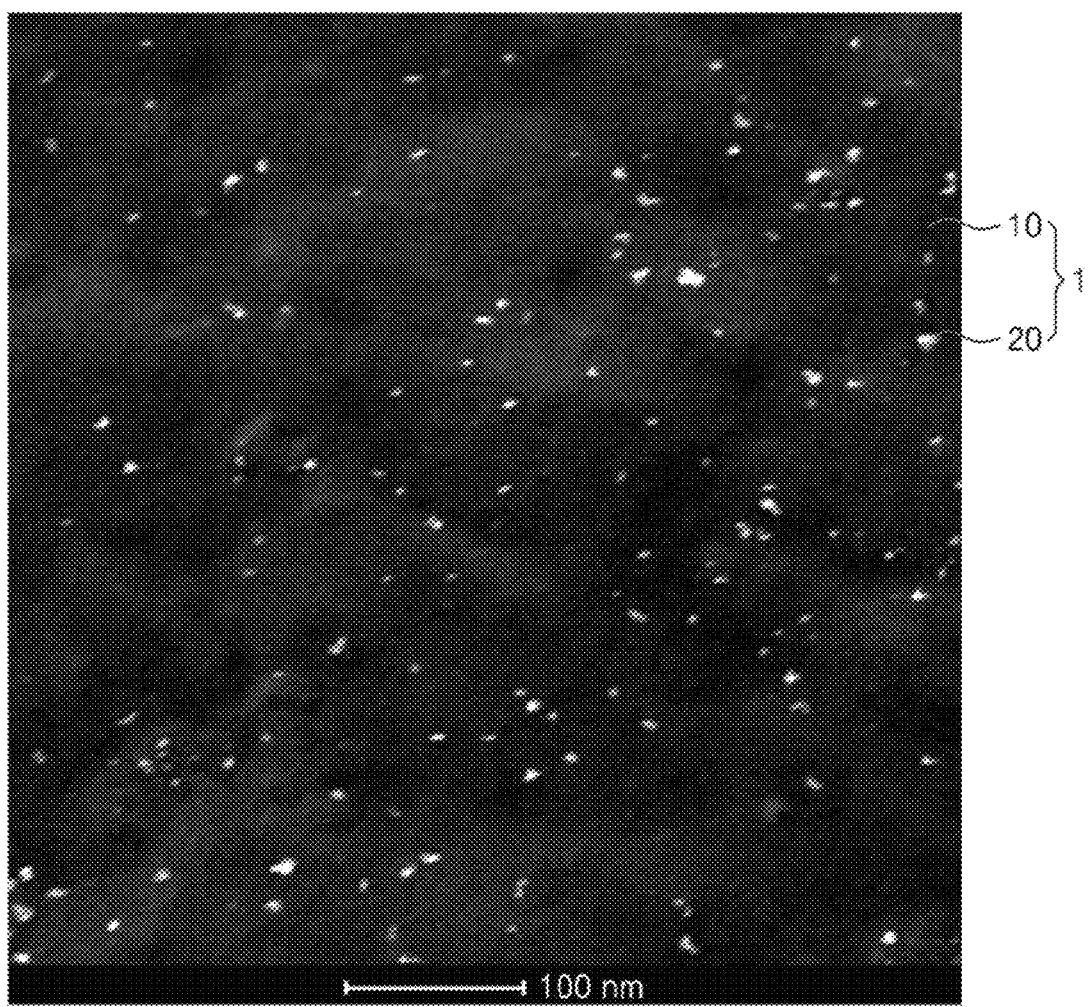
FIG. 1 is a transmission electron microscopy (TEM) image showing a portion of a material for hot stamping according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The disclosure may include various exemplary embodiments and modifications, and certain embodiments thereof will be illustrated in the drawings and will be described herein in detail. Effects and features of the disclosure and the accomplishing methods thereof will become apparent from the embodiments described below in detail with reference to the accompanying drawings. However, the disclosure is not limited to the embodiments described below and may be embodied in various forms.

Hereinafter, embodiments will be described in detail with reference to the accompanying drawings, and when describing with reference to the drawings, the same or corresponding elements will be given the same reference numerals, and the repeated description thereof will be omitted.

In the following embodiments, the terms, "first", "second", etc. are only used to distinguish one element from another rather than a limited meaning.

The singular forms are intended to include the plural forms as well, unless the context clearly indicates otherwise.

It will be understood that the terms "comprises," "comprising," "includes," or "including," when used herein, specify the presence of stated features or elements, but do not preclude the presence or addition of one or more other features or elements.

When a layer, area, or element is referred to as being on another layer, area, or element, it may be directly or indirectly on the other layer, area, or element, and an intervening layer, area, or element may be present.

In the drawings, the sizes of elements may be exaggerated or reduced for convenience of description. For example, since the size and thickness of each element shown in the drawings are arbitrarily shown for convenience of description, the disclosure is not necessarily limited to those shown.

When a certain embodiment is capable of being implemented differently, a particular process order may be performed differently from the described order. Two processes described in succession may be performed substantially simultaneously or may be performed in an order opposite to the described order.

As used herein, the expression "A and/or B" represents A, B, or A and B. Also, the expression "at least one of A and B" represents A, B, or A and B.

It will be understood that when a layer, a region, or an element is referred to as being "connected to" or "coupled to" another element, it may be directly connected or coupled to the other element and/or an intervening element may be present so that the element may be indirectly electrically connected to the other element. For example, when a layer, a region, or an element is referred to as being electrically connected to another element, it may be directly electrically connected to the other element or an intervening element may be present so that the element may be indirectly electrically connected to the other element.

Hereinafter, embodiments of the disclosure will be described in detail with the accompanying drawings.

FIG. 1 is a transmission electron microscopy (TEM) image showing a portion of a material for hot stamping according to an exemplary embodiment.

As shown in FIG. 1, a material 1 for hot stamping according to an exemplary embodiment may include a steel sheet 10 and fine precipitates 20 distributed within the steel sheet 10.

The steel sheet 10 may be a steel sheet that is manufactured by performing a hot rolling process and/or a cold rolling process on a slab that is cast to include a certain alloy element in a certain content. The steel sheet 10 may include carbon (C), silicon (Si), manganese (Mn), phosphorus (P), sulfur (S), chromium (Cr), boron (B), balance iron (Fe), and other inevitable impurities. In addition, in one exemplary embodiment, the steel sheet 10 may further include, as an additive, at least one of titanium (Ti), niobium (Nb), and vanadium (V). In another exemplary embodiment, the steel sheet 10 may further include a certain content of calcium (Ca).

Carbon (C) functions as an austenite stabilizing element within the steel sheet 10. Carbon is a major element that determines strength and hardness of the steel sheet 10 and, after a hot stamping process, is added to secure tensile strength of the steel sheet 10 (for example, tensile strength greater than or equal to 1,350 MPa) and secure hardenability characteristics. Carbon as described above may be included in an amount of 0.19 wt % to 0.25 wt % with respect to the total weight of the steel sheet 10. When a content of carbon is less than 0.19 wt %, a hard phase (martensite or the like)

may not be secured, and thus, mechanical strength of the steel sheet 10 may not be satisfied. In contrast, when the content of the carbon is greater than 0.25 wt %, brittleness of the steel sheet 10 may occur or a bending performance of the steel sheet 10 may be reduced.

Silicon (Si) functions as a ferrite stabilizing element within the steel sheet 10. Silicon (Si) is a solid solution strengthening element, improves ductility of the steel sheet 10, and suppresses the formation of a low-temperature range carbide, thereby improving carbon concentration within austenite. In addition, silicon is a key element in hot-rolled, cold-rolled, and hot-pressed structure homogenization (perlite, manganese segregation control) and ferrite fine dispersion. Silicon functions as a control element for martensite strength heterogeneity to improve a collision performance. Such silicon may be included in an amount of 0.1 wt % to 0.6 wt % with respect to the total weight of the steel sheet 10. When a content of silicon is less than 0.1 wt %, the above-described effects may not be acquired, cementite may be formed and coarsening may occur in a final hot stamping martensite structure. In addition, a uniformity effect of the steel sheet 10 is insignificant, and a V-bending angle may not be secured. In contrast, when the content of silicon is greater than 0.6 wt %, hot rolling and cold rolling loads may increase, hot rolling red scale may become excessive, and plating characteristics of the steel sheet 10 may deteriorate.

Manganese (Mn) functions as an austenite stabilizing element within the steel sheet 10. Manganese (Mn) is added to increase hardenability and strength during heat treatment. Such manganese may be included in an amount of 0.8 wt % to 1.6 wt % with respect to the total weight of the steel sheet 10. When a content of manganese is less than 0.8 wt %, a grain refinement effect is insufficient, and thus, a hard phase fraction in a formed product may be insufficient after hot stamping due to insufficient hardenability. When the content of manganese is greater than 1.6 wt %, ductility and toughness may be reduced due to manganese segregation or a pearlite band, thereby causing a decrease in the bending performance and generating an inhomogeneous microstructure.

Phosphorus (P) may be included in an amount greater than 0 wt % and less than or equal to 0.03 wt % with respect to the total weight of the steel sheet 10 to prevent a decrease in the toughness of the steel sheet 10. When a content of phosphorus is greater than 0.03 wt %, an iron phosphide compound may be formed to reduce the toughness and weldability, and cracks may be generated in the steel sheet 10 during a manufacturing process.

Sulfur (S) may be included in an amount greater than 0 wt % and less than or equal to 0.015 wt % with respect to the total weight of the steel sheet 10. When a content of sulfur is greater than 0.015 wt %, hot workability, weldability, and impact characteristics may be deteriorated, and a surface defect such as cracks may occur due to formation of a large inclusion.

Chromium (Cr) is added to improve the hardenability and strength of the steel sheet 10. Chromium enables grain refinement and strength to be secured through precipitation hardening. Such chromium may be included in an amount of 0.1 wt % to 0.6 wt % with respect to the total weight of the steel sheet 10. When a content of chromium is less than 0.1 wt %, the precipitation hardening effect is poor. In contrast, when the content of chromium is greater than 0.6 wt %, Cr-based precipitates and matrix solid solution increase, thereby lowering the toughness and increasing raw cost to increase production costs.

Boron (B) is added to secure the hardenability and strength of the steel sheet 10 by securing a martensite structure by suppressing ferrite, pearlite and bainite transformation. Boron segregates at a grain boundary to lower gain boundary energy to thereby increase the hardenability and to increase an austenite grain growth temperature to thereby have the grain refinement effect. Such boron may be included in an amount of 0.001 wt % to 0.005 wt % with respect to the total weight of the steel sheet 10. When boron is included in the above range, the occurrence of hard grain boundary brittleness may be prevented, and high toughness and bendability may be secured. When a content of boron is less than 0.001 wt %, a hardenability effect is insufficient. In contrast, when the content of boron is greater than 0.005 wt %, boron has low solid solubility, and thus is easily precipitated at the grain boundary according to heat treatment conditions, thereby deteriorating the hardenability or causing high temperature embrittlement and causing hard grain boundary brittleness to decrease the toughness and bendability.

An additive is a nitride or carbide generating element that contributes to the formation of the fine precipitates 20. In detail, the additive may include at least one of titanium (Ti), niobium (Nb), and vanadium (V). Titanium (Ti), niobium (Nb), and vanadium (V) secure the strength of a hot stamped and quenched material by forming the fine precipitates 20 in the form of nitride or carbide. In addition, titanium (Ti), niobium (Nb), and vanadium (V) are included in Fe—Mn-based composite oxide, operate as a hydrogen trap site effective for improving delayed fracture resistance characteristics, and are elements for improving the delayed fracture resistance characteristics. Such an additive may be included in total content less than or equal to 0.1 wt % with respect to the total weight of the steel sheet 10. When a content of the additive is greater than 0.1 wt %, yield strength may excessively increase.

Titanium (Ti) may be added to strengthen hardenability and improve a material by forming precipitates after hot press heat treatment. In addition, titanium (Ti) effectively contributes to refinement of austenite grains by forming a precipitated phase such as Ti (C, N) at a high temperature. Such titanium may be included in an amount of 0.025 wt % to 0.050 wt % with respect to the total weight of the steel sheet 10. When titanium is included in the above content range, poor continuous casting and coarsening of precipitates may be prevented, the physical characteristics of steel may be easily secured, and defects such as the occurrence of cracks in a surface of the steel may be prevented. In contrast, when the content of titanium is greater than 0.050 wt %, precipitates may be coarsened, thereby decreasing elongation and bendability.

Niobium (Nb) and vanadium (V) are added to increase strength and toughness according to a decrease in a martensite packet size. Each of niobium and vanadium may be included in an amount of 0.025 wt % to 0.050 wt % with respect to the total weight of the steel sheet 10. When niobium and vanadium are included in the above range, steel has a high grain refinement effect in hot rolling and cold rolling processes, the occurrence of cracks in a slab and brittle fracture of a product during may be prevented steelmaking/continuous casting, and the generation of steelmaking coarse precipitates may be made lowest.

Calcium (Ca) may be added to control a shape of an inclusion. Such calcium may be included in an amount less than or equal to 0.003 wt % with respect to the total weight of the steel sheet 10.

The fine precipitates 20 may be distributed within the steel sheet 10 to trap hydrogen. In other words, the fine precipitates 20 may improve hydrogen delayed fracture characteristics of a hot stamped product by providing a trap site for hydrogen introduced into the interior during or after manufacturing of the material 1 for hot stamping. In an exemplary embodiment, the fine precipitates 20 may include nitride or carbide of an additive. In detail, the fine precipitates 20 may include nitride or carbide of at least one of titanium (Ti), niobium (Nb), and vanadium (V).

A precipitation behavior of the fine precipitates 20 may be controlled by adjusting process conditions. For example, the precipitation behavior such as the number of fine precipitates 20, a mean distance between the fine precipitates 20 or diameters of the fine precipitates 20 may be controlled by adjusting a coiling temperature (CT) range from among the process conditions. The process conditions will be described later in detail with reference to FIG. 3.

In an exemplary embodiment, the number of fine precipitates 20 formed within the steel sheet 10 may be controlled to satisfy a preset range. In detail, the fine precipitates 20 may be formed, within the steel sheet 10, in an amount greater than or equal to 7,000 pieces/100 $\mu m^2$ and less than or equal to 16,500 pieces/100 $\mu m^2$. In particular, from among the fine precipitates 20 distributed within the steel sheet 10, fine precipitates having a diameter less than or equal to 0.01 $\mu m$ may be formed, within the steel sheet 10, in an amount greater than or equal to 4,500 pieces/100 $\mu m^2$ and less than or equal to 16,000 pieces/100 $\mu m^2$.

When the number of formed fine precipitates 20 is within the above-described range, after hot stamping, needed tensile strength (for example, 1,350 MPa) may be secured, and formability or bendability may be improved. For example, when the number of fine precipitates 20 having a diameter less than or equal to 0.01 $\mu m$ is less than 4,500 pieces/100 $\mu m^2$, the strength may be reduced. In contrast, when the number exceeds 16,000 pieces/100 $\mu m^2$, the formability or bendability may deteriorate.

In another exemplary embodiment, a mean distance between adjacent fine precipitates 20 may be controlled to satisfy a preset range. Here, the "mean distance" may refer to a mean free path of the fine precipitates 20, and a method of measuring the mean distance will be described later in detail.

In detail, the mean distance between the fine precipitates 20 may be greater than or equal to 0.4 $\mu m$ and less than or equal to 0.8 When the mean distance between the fine precipitates 20 is less than 0.4 the formability or bendability may deteriorate. In contrast, when the mean distance between the fine precipitates 20 exceeds 0.8 the strength may be reduced.

In another exemplary embodiment, the diameter of the fine precipitates 20 may be controlled to satisfy preset conditions. In detail, an amount greater than or equal to 60% of the fine precipitates 20 formed within the steel sheet 10 may be formed to have a diameter less than or equal to 0.01 Also, an amount greater than or equal to 25% of the fine precipitates 20 formed within the steel sheet 10 may be formed to have a diameter less than or equal to 0.005 In addition, in an alternative embodiment, a mean diameter of the fine precipitates 20 formed within the steel sheet 10 may be less than or equal to 0.007 $\mu m$.

The diameter of the fine precipitates 20 described above significantly affects improvement of the hydrogen delayed fracture characteristics. Hereinafter, a difference in the effect of improving the hydrogen delayed fracture characteristics according to the diameter of the fine precipitates 20 will be described with reference to FIGS. 2A and 2B.

Figure 2A:
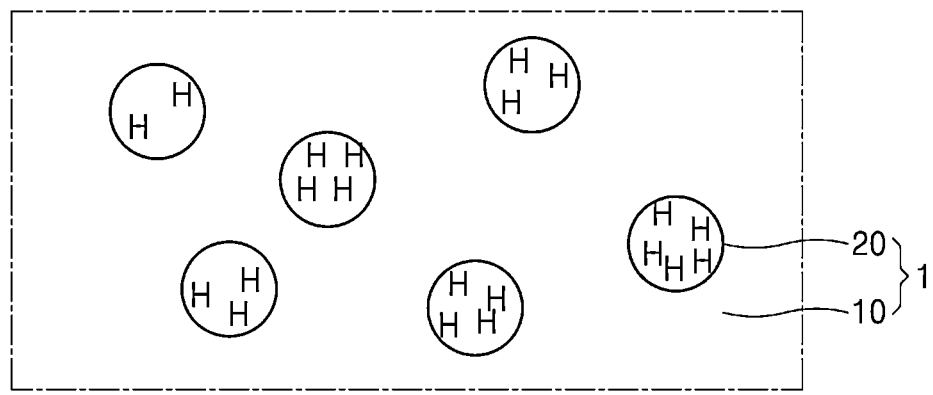
FIGS. 2A and 2B are exemplary views schematically illustrating a portion of a state in which hydrogen is trapped in fine precipitates.
Figure 2B:
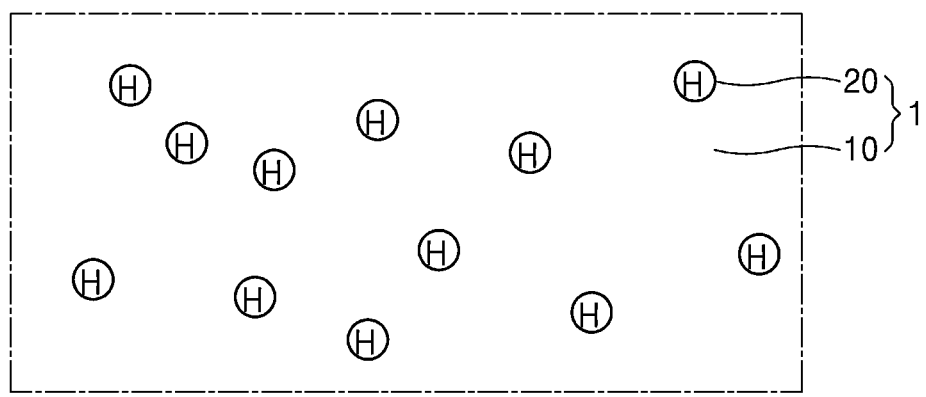

FIGS. 2A and 2B are example views schematically illustrating a portion of a state in which hydrogen is trapped in the fine precipitates 20.

In detail, FIG. 2A illustrates that hydrogen is trapped in the fine precipitates 20 having a relatively great diameter, and FIG. 2B illustrates that hydrogen is trapped in the fine precipitates 20 having a relatively small diameter.

As shown in FIG. 2A, when a diameter of the fine precipitates 20 is relatively great, the number of hydrogen atoms trapped in one fine precipitate 20 increases. In other words, hydrogen atoms introduced into the steel sheet 10 are not evenly dispersed, and the probability of a plurality of hydrogen atoms being trapped in one hydrogen trap site increases. The plurality of hydrogen atoms trapped in the one hydrogen trap site may be combined with one another to form a hydrogen molecule $H_2$. The formed hydrogen molecule may increase the probability of generating internal pressure, and as a result, may deteriorate hydrogen delayed fracture characteristics of a hot stamped product.

In contrast, as shown in FIG. 2B, when the diameter of the fine precipitates 20 is relatively small, the probability of a plurality of hydrogen atoms being trapped in one fine precipitate 20 decreases. In other words, hydrogen atoms introduced into the steel sheet 10 may be trapped in different hydrogen trap sites to be relatively evenly dispersed. Accordingly, the hydrogen atoms may not be combined with one another, and thus, the probability of generating internal pressure may decrease due to a hydrogen molecule, thereby improving hydrogen delayed fracture characteristics of a hot stamped product.

Meanwhile, a precipitation behavior of the fine precipitates 20 as described above may be measured by a method of analyzing a transmission electron microscopy (TEM) image. In detail, TEM images for certain areas as many as a preset number may be acquired for a specimen. The fine precipitates 20 may be extracted from acquired images through an image analysis program or the like, and the number of fine precipitates 20, a mean distance between the fine precipitates 20, a diameter of the fine precipitates 20, and the like may be measured for the extracted fine precipitates 20.

In an exemplary embodiment, a surface replication method may be applied as pretreatment to a specimen to be measured to measure the precipitation behavior of the fine precipitates 20. For example, a first-stage replica method, a second-stage replica method, an extraction replica method, or the like may be applied but are not limited to the above-described examples.

In another exemplary embodiment, when measuring the diameters of the fine precipitates 20, the diameters of the fine precipitates 20 may be calculated by converting the shapes of the fine precipitates 20 into circles in consideration of the uniformity of the shapes of the fine precipitates 20. In detail, an area of the extracted fine precipitate 20 may be measured by using a unit pixel having a particular area, and the diameter of the fine precipitate 20 may be calculated by converting a shape of the fine precipitate 20 into a circle having the same area as the measured area.

In another exemplary embodiment, the mean distance between the fine precipitates 20 may be measured via the mean free path described above. In detail, the mean distance between the fine precipitates 20 may be calculated by using a particle area fraction and the number of particles per unit length. For example, the mean distance between the fine precipitates 20 may have a correlation as in Equation 1 below.

$$\lambda = (1-AA)/NL \quad \text{[Equation 1]}$$

($\lambda$: mean distance between particles, AA: particle area fraction, NL: number of particles per unit length)

A method of measuring the precipitation behavior of the fine precipitates 20 is not limited to the above-described example, and various methods may be applied.

Figure 3:
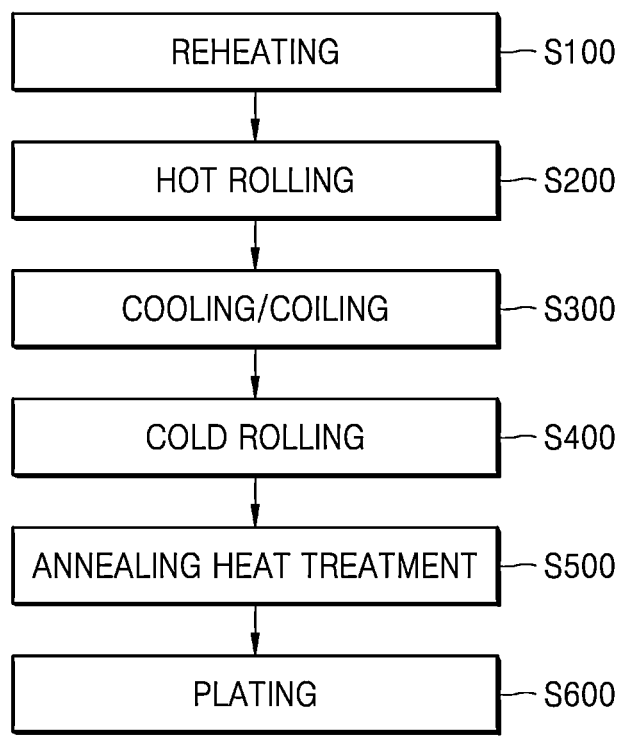
FIG. 3 is a flowchart schematically showing a method of manufacturing a material for hot stamping, according to an exemplary embodiment.

FIG. 3 is a flowchart schematically illustrating a method of manufacturing a material for hot stamping, according to an exemplary embodiment.

As shown in FIG. 3, a method of manufacturing a material for hot stamping according to an exemplary embodiment may include reheating operation S100, hot rolling operation S200, cooling/coiling operation S300, cold rolling operation S400, annealing heat treatment operation S500, and plating operation S600.

For reference, FIG. 3 shows that operations S100 through S600 are independent operations. Some of operations S100 through S600 may be performed in one process, and some of operations S100 through S600 may also be omitted as needed.

A slab in a semi-finished product to be subjected to a process of forming the material 1 for hot stamping is provided. The slab may include carbon (C) in an amount of 0.19 wt % to 0.25 wt %, silicon (Si) in an amount of 0.1 wt % to 0.6 wt %, manganese (Mn) in an amount of 0.8 wt % to 1.6 wt %, phosphorus (P) in an amount less than or equal to 0.03 wt %, sulfur (S) in an amount less than or equal to 0.015 wt %, chromium (Cr) in an amount of 0.1 wt % to 0.6 wt %, boron (B) in an amount of 0.001 wt % to 0.005 wt %, an additive in an amount less than or equal to 0.1 wt %, balance iron (Fe), and other inevitable impurities. In addition, the slab may further include an additive in total less than or equal to 0.1 wt %. Here, the additive may include at least one of titanium (Ti), niobium (Nb), and vanadium (V). For example, a content of each of titanium (Ti), niobium (Nb), and/or vanadium (V) may be 0.025 wt % to 0.050 wt %.

Reheating operation S100 is an operation of reheating the slab for hot rolling. In reheating operation S100, components segregated during casting are resolved by reheating, within a certain temperature range, the slab secured through a continuous casting process.

A slab reheating temperature (SRT) may be controlled within a preset temperature range to significantly improve austenite refinement and a precipitation hardening effect. Here, a range of the slab reheating temperature (SRT) may be included in a temperature range (about 1,000° C.) in which an additive (Ti, Nb, and/or V) is fully resolved on the basis of an equilibrium precipitation amount of the fine precipitates 20 when reheating the slab. When the slab reheating temperature (SRT) is less than the temperature range in which the additive (Ti, Nb, and/or V) is fully resolved, a driving force needed for microstructure control is not sufficiently reflected during hot rolling, and thus, an effect of securing high-quality mechanical characteristics through needed precipitation control may not be obtained.

In an exemplary embodiment, the slab reheating temperature (SRT) may be controlled to 1,200° C. to 1,250° C. When the slab reheating temperature (SRT) is less than 1,200° C., the components segregated during casting are not sufficiently resolved, and thus, a homogenization effect of an alloy element may not be significantly shown, and a solid solution effect of titanium (Ti) may not be significantly shown. In contrast, when the slab reheating temperature (SRT) is high, the slab reheating temperature (SRT) is favorable for homogenization. When the slab reheating temperature (SRT) is higher than 1,250° C., an austenite grain size increases, and thus, the strength may not be secured, and only a manufacturing cost of a steel sheet may increase due to an excessive heating process.

Hot rolling operation S200 is an operation of manufacturing a steel sheet by hot rolling the slab reheated in operation S100 within a range of a certain finishing delivery temperature (FDT). In an exemplary embodiment, the range of the finishing delivery temperature (FDT) may be controlled to 840° C. to 920° C. When the finishing delivery temperature (FDT) is less than 840° C., the workability of the steel sheet may not be secured due to the occurrence of a duplex grain structure due to rolling over an abnormal area. Also, the workability may deteriorate due to the microstructure unevenness, and a passing ability may occur during hot rolling due to a rapid phase change. In contrast, when the finishing delivery temperature (FDT) is higher than 920° C., austenite grains are coarsened. In addition, TiC precipitates are coarsened, and thus, the performance of a final part may deteriorate.

In reheating operation S100 and hot rolling operation S200, some of the fine precipitates 20 may be precipitated at grain boundaries at which energy is unstable. Here, the fine precipitates 20 precipitated at the grain boundaries operate as factors that interfere with the growth of austenite grains, thereby providing an effect of enhancing the strength through austenite refinement. The fine precipitates 20 precipitated in operations S100 and S200 may be at a level of 0.007 wt % on the basis of the equilibrium precipitation amount but are not limited thereto.

Cooling/coiling operation S300 is an operation of cooling and coiling the steel sheet hot-rolled in operation S200 in a range of a certain coiling temperature (CT) and forming the fine precipitates 20 within the steel sheet. In other words, in operation S300, the fine precipitates 20 are formed by forming nitride or carbide of the additive (Ti, Nb, and/or V) included in the slab. Coiling may be performed in a ferrite zone so that the equilibrium precipitation amount of the fine precipitates 20 reaches the greatest value. After grain recrystallization is completed as described above, when a structure is transformed into ferrite, the particle size of the fine precipitates 20 may be uniformly precipitated not only at the grain boundary but also in the grain.

In an exemplary embodiment, the coiling temperature (CT) may be 700° C. to 780° C. The coiling temperature (CT) affects redistribution of carbon (C). When the coiling temperature (CT) is less than 700° C., a low temperature phase fraction may increase due to subcooling, and thus, the strength may increase, a rolling load may increase during cold rolling, and ductility may rapidly decrease. In contrast, when the coiling temperature (CT) is higher than 780° C., formability and strength may deteriorate due to abnormal grain growth or excessive grain growth.

According to the present exemplary embodiment as described above, the precipitation behavior of the fine precipitates 20 may be controlled by controlling the range of the coiling temperature CT. An experimental example for a change in characteristics of the material 1 for hot stamping according to the range of the coiling temperature (CT) will be described later with reference to FIGS. 4, 5A, and 5B.

Cold rolling operation S400 is an operation of uncoiling the steel sheet coiled in operation S300 to pickle the steel sheet, and then cold rolling the steel sheet. Here, pickling is performed to remove scale of the coiled steel sheet, that is, a hot-rolled coil manufactured through the hot rolling process described above. In an exemplary embodiment, during cold rolling, a reduction ratio may be controlled to 30% to 70% but is not limited thereto.

Annealing heat treatment operation S500 is an operation of performing annealing heat treatment on the steel sheet cold rolled in operation S400 at a temperature higher than or equal to 700° C. In an exemplary embodiment, annealing heat treatment includes an operation of heating a cold-rolled sheet material and cooling the heated cold-rolled sheet material at a certain cooling rate.

Plating operation S600 is an operation of forming a plating layer on the annealing heat-treated steel sheet. In an exemplary embodiment, in plating operation S600, an Al—Si plating layer may be formed on the steel sheet annealing heat-treated in operation S500.

In detail, plating operation S600 may include: an operation of forming a hot-dip plating layer on a surface of the steel sheet by immersing the steel sheet in a plating bath having a temperature of 650° C. to 700° C.; and a cooling operation of forming a plating layer by cooling the steel sheet on which the hot-dip plating layer is formed. Here, the plating bath may include, as an additional element, Si, Fe, Al, Mn, Cr, Mg, Ti, Zn, Sb, Sn, Cu, Ni, Co, In, Bi, or the like but is not limited thereto.

A hot stamping part satisfying the required strength and bendability may be manufactured by performing a hot stamping process on the material 1 for hot stamping that is manufactured through operations S100 through S600 as described above. In an exemplary embodiment, the material 1 for hot stamping manufactured to satisfy the above-described content conditions and process conditions may have tensile strength greater than or equal to 1,350 MPa and bendability greater than or equal to 50° after undergoing the hot stamping process.

Hereinafter, the disclosure will be described in more detail through an exemplary embodiment and a comparative example. However, the following exemplary embodiment and comparative example are intended to more specifically illustrate the disclosure, and the scope of the disclosure is not limited by the following exemplary embodiment and comparative example. The following exemplary embodiment and comparative example may be appropriately modified and changed by one of ordinary skill in the art within the scope of the disclosure.

Figure 4:
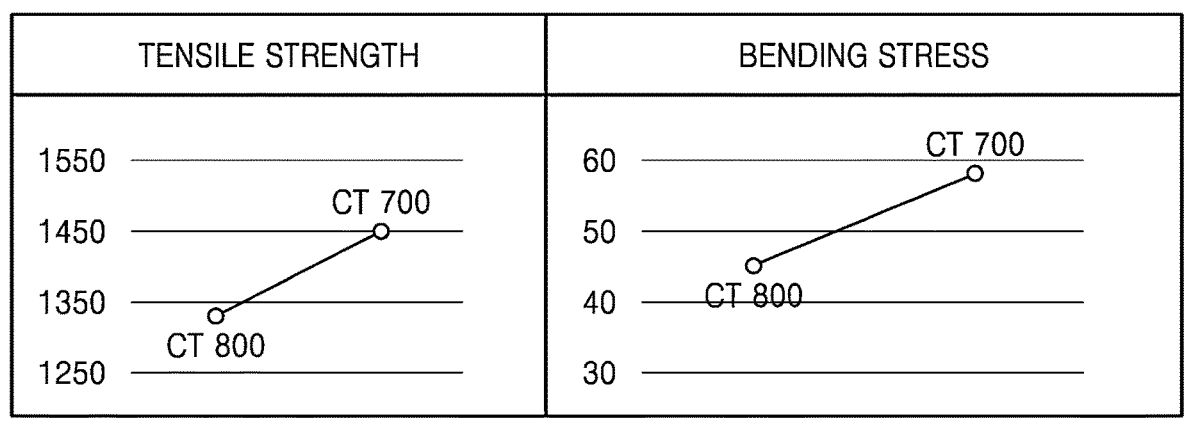
FIG. 4 is a graph showing a comparison of tensile strength and bending stress according to an exemplary embodiment of the disclosure and a comparative example according to a coiling temperature.
Figure 5A:
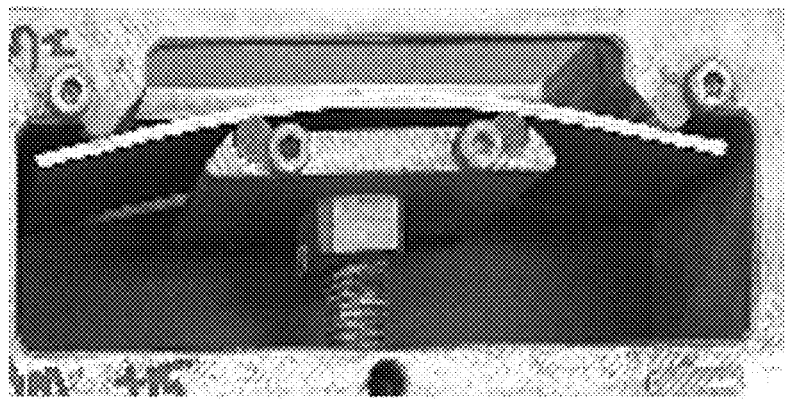
FIGS. 5A and 5B are images showing results of a 4-point bending test according to an exemplary embodiment and a comparative example according to a coiling temperature.
Figure 5B:
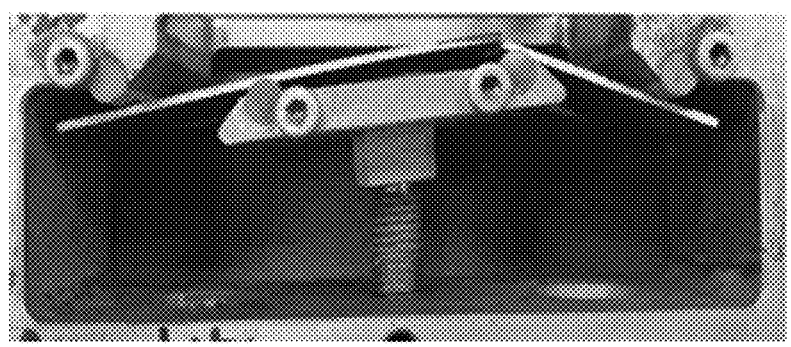

FIG. 4 is a graph illustrating a comparison of tensile strength and bending stress of an embodiment and a comparative example according to a coiling temperature. FIGS. 5A and 5B are images showing results of a 4-point bending test of an embodiment and a comparative example according to a coiling temperature.

An embodiment CT 700 and a comparative example CT 800 are specimens that were manufactured by hot stamping the material 1 for hot stamping manufactured by performing operations S100 through S600 on the slab having a composition as shown in Table 1 below. Here, the embodiment CT 700 and the comparative example CT 800 are specimens that were manufactured by applying the same content conditions and process conditions in a process of manufacturing the material 1 for hot stamping but differentially applying only the coiling temperature (CT) as a variable.

TABLE 1

| components (wt %) | | | | | | | |
|---|---|---|---|---|---|---|---|
| C | Si | Mn | P | S | Cr | B | Additive |
| 0.19~0.25 | 0.1~0.6 | 0.8~1.6 | less than or equal to 0.03 | less than equal to 0.015 | 0.1~0.6 | 0.001~0.005 | less than or equal to 0.1 |

In detail, the embodiment CT 700 is a specimen that was manufactured by hot stamping the material 1 for hot stamping manufactured by applying the coiling temperature CT of 700° C., and the comparative example CT 800 is a specimen that was manufactured by hot stamping the material 1 for hot stamping manufactured by applying the coiling temperature (CT) of 800° C.

FIG. 4 is a graph showing tensile strength and bending stress measured in the embodiment CT 700 and the comparative example CT 800.

Referring to FIG. 4, in the case of tensile strength, the tensile strength of the embodiment CT 700 was greater than the tensile strength of the comparative example CT 800. Even in the case of bending stress affecting impact characteristics, the bending stress of the embodiment CT 700 was improved compared to the bending stress of the comparative stress CT 800.

This is because, as shown in Table 2 below, in the case of the embodiment CT 700, a precipitation amount of the fine precipitates 20 increased and a hydrogen trapping ability was improved accordingly compared to the comparative example CT 800.

Table 2 below shows measured values of an equilibrium precipitation amount and an amount of activated hydrogen of the embodiment CT 700 and the comparative example CT 800, and results of a bent-beam stress corrosion test on the embodiment CT 700 and the comparative example CT 800. Here, the equilibrium precipitation amount refers to the greatest number of precipitates that may be precipitated when equilibrium is achieved thermodynamically, and, as the equilibrium precipitation amount is great, the number of precipitated precipitates increases. Also, the amount of activated hydrogen refers to an amount of hydrogen excluding hydrogen trapped in the fine precipitates 20 from among hydrogen introduced into the steel sheet 10.

The amount of activated hydrogen as described above may be measured by a thermal desorption spectroscopy method. In detail, while heating a specimen at a preset heating rate to raise a temperature, an amount of hydrogen released from the specimen at a temperature lower than or equal to a particular temperature may be measured. Here, hydrogen released from the specimen at the temperature lower than or equal to the particular temperature may be understood as activated hydrogen that are not trapped and affect hydrogen delayed fracture, from among hydrogen introduced into the specimen.

TABLE 2

| sample name | equilibrium precipitation amount (wt %) | result of 4-point bending test | amount of activated hydrogen (wppm) |
|---|---|---|---|
| CT 700 | 0.028 | nonfracture | 0.780 |
| CT 800 | 0.009 | fracture | 0.801 |

Table 2 above shows results of the 4-point bending test that was performed on samples respectively having different equilibrium precipitation amounts of fine precipitates, and amounts of activated hydrogen measured by using the thermal desorption spectroscopy method.

Here, the 4-point bending test refers to a test method of checking whether or not a stress corrosion crack occurs while applying, to a specimen manufactured by reproducing a state of exposing the specimen to a corrosive environment, stress at a level lower than or equal to an elastic limit at a particular point. Here, the stress corrosion crack refers to a crack occurring when corrosion and continuous tensile stress act simultaneously.

In detail, the results of the 4-point bending test in Table 2 are from checking whether or not fracture occurred by applying, to each of the samples, stress of 1,000 MPa for 100 hours in air. In addition, the amounts of activated hydrogen were measured by using the thermal desorption spectroscopy method and are values obtained by measuring an amount of hydrogen released from the specimen at a temperature less than or equal to 350° C. while raising a temperature from room temperature to 500° C. at a heating rate of 20° C./min for each of the samples.

Referring to Table 2 above, in the case of the equilibrium precipitation amount of the fine precipitates 20, the equilibrium precipitation amount of the embodiment CT 700 was measured as 0.028 wt %, and the equilibrium precipitation amount of the comparative example CT 800 was measured as 0.009 wt %. In other words, the embodiment CT 700 may provide more hydrogen trap sites by forming more fine precipitates 20 compared to the comparative example CT 800.

In the case of the result of the 4-point bending test, the embodiment CT 700 was not fractured, and the comparative example CT 800 was fractured. In addition, in the case of the amount of activated hydrogen, the amount of activated hydrogen of the embodiment CT 700 was measured as about 0.780 wppm, and the amount of activated hydrogen of the comparative example CT 80 was measured as about 0.801 wppm. In this regard, the embodiment CT 700 having a relatively less amount of activated hydrogen was not fractured, and the comparative example CT 800 having a relatively greater amount of activated hydrogen was fractured. This may be understood that the embodiment CT 700 had improved hydrogen delayed fracture characteristics compared to the comparative example CT 800.

In other words, in the embodiment CT 700, a precipitation amount of fine precipitates 20 increased compared to the comparative example CT 800, and accordingly, the amount of activated hydrogen decreased. This indicates that the amount of hydrogen trapped in the embodiment CT 700 increased compared to the comparative example CT 800, and as a result, may be understood that the hydrogen delayed fracture characteristics were improved.

FIGS. 5A and 5B are images respectively showing results of performing a 4-point bending test on the embodiment CT 700 and the comparative example CT 800.

In detail, FIG. 5A shows a result of performing a 4-point bending test on the embodiment CT 700, and FIG. 5B corresponds to a result of performing the 4-point bending test on the comparative example CT 800 by applying the same conditions as in the embodiment CT 700.

As shown in FIGS. 5A and 5B, while in the case of the embodiment CT 700, a specimen was not fractured as a result of the 4-point bending test, in the case of the comparative example CT 800, a specimen was fractured.

This indicates that the embodiment CT 700 of FIG. 5A is a specimen manufactured by hot stamping the material 1 for hot stamping manufactured by applying a coiling temperature (CT) of 700° C., wherein fine precipitates 20 having a diameter less than or equal to 0.01 μm were formed in the number greater than or equal to 4,500 and less than or equal to 16,000 per unit area 100 μm², and a mean distance between the fine precipitates 20 satisfied greater than or equal to 0.4 μm and less than or equal to 0.8 μm. Accordingly, in the embodiment CT 700, hydrogen delayed fracture characteristics were improved by efficiently dispersing and trapping hydrogen introduced into the steel sheet 10, and tensile strength and bending characteristics were improved.

In contrast, the comparative example CT 800 of FIG. 5B is a specimen manufactured by hot stamping the material 1 for hot stamping manufactured by applying a coiling temperature of 800° C. The precipitation amount of the fine precipitates 20 was insufficient, and a diameter of the fine precipitates 20 was coarsened, thereby increasing the probability of generating internal pressure due to hydrogen bonding. Accordingly, in the comparative example CT 800, hydrogen introduced into the steel sheet 10 was not efficiently dispersed and trapped, and tensile strength, bending characteristics, and hydrogen delayed fracture characteristics deteriorated.

In other words, although the material 1 for hot stamping is made of the same components, due to a difference in a coiling temperature (CT), differences occur in strength, bendability, and hydrogen delayed fracture characteristics of the material 1 for hot stamping after a hot stamping process. This is because a difference occurs in the precipitation behavior of the fine precipitates 20 according to the coiling temperature (CT). Therefore, when content conditions and process conditions according to the above-described exemplary embodiments are applied, high strength may be secured, and bendability and hydrogen delayed fracture characteristics may be improved.

Table 3 below shows, for a plurality of specimens, numerical representations of tensile strength, bendability, and hydrogen delayed fracture characteristics according to a difference in a precipitation behavior of fine precipitates 20. In detail, Table 3 shows, for the plurality of specimens, measured values of the precipitation behavior (the number of fine precipitates 20, a mean distance between the fine precipitates 20, a diameter of the fine precipitates 20, and the like) and measured values of characteristics (tensile strength, bendability, and an amount of activated hydrogen) after hot stamping.

Each of the plurality of specimens was heated to a temperature higher than or equal to Ac3 (a temperature at which transformation from ferrite to austenite is completed) and cooled to a temperature less than or equal to 300° C. at a cooling rate higher than or equal to 30° C./s, and then tensile strength, bendability, and an amount of activated hydrogen were measured.

Here, the tensile strength and the amount of activated hydrogen were measured on the basis of the 4-point bending test and the thermal desorption spectroscopy method described above, and the bendability was obtained by measuring V-bending angle according to VDA238-100 which is the standard of Verband Der Automobilindustrie (VDA).

Also, the precipitation behavior of fine precipitates (the number of fine precipitates, the mean distance between the fine precipitates, the diameter of the fine precipitates, and the like) was measured through TEM image analysis as described above. In addition, the precipitation behavior of the fine precipitates was measured by measuring a precipitation behavior of fine precipitates for certain regions having an area of 0.5 μm*0.5 μm and converting the precipitation behavior on the basis of a unit area 100 μm².

The specimens A through J in Table 3 above are specimens that were manufactured by hot stamping the material 1 for hot stamping manufactured through operations S100 through S600 by applying the above-described process conditions to a slab satisfying the above-described content conditions (refer to Table 1). In other words, the specimens A through J are specimens that satisfy precipitation behavior conditions of fine precipitates described above. In detail, the specimens A through J satisfy the precipitation behavior conditions in which fine precipitates are formed, within a steel sheet, greater than or equal to 7,000 pieces/100 μm² and less than or equal to 16,500 pieces/100 μm², a mean diameter of all fine precipitates is less than or equal to 0.007 and a mean distance between all fine precipitates satisfies greater than or equal to 0.4 μm and less than or equal to 0.8 Also,

TABLE 3

| specimen | total number of fine precipitates (piece/100 μm²) | diameter less than or equal to 0.01 μm fine precipitates number (piece/100 μm²)/ratio (%) | total fine precipitates mean distance (μm) | diameter less than or equal to 0.005 μm fine precipitates number (piece/100 μm²)/ratio (%) | total fine precipitates mean diameter (μm) | after hot stamping tensile strength (MPa) | after hot stamping bendability (°) | after hot stamping amount of activated hydrogen (wppm) |
|---|---|---|---|---|---|---|---|---|
| A | 7,020 | 4,577/65.2% | 0.69 | 1,755/25.0% | 0.0064 | 1382 | 54 | 0.789 |
| B | 7,026 | 6,513/92.7% | 0.65 | 2,677/38.1% | 0.0068 | 1400 | 57 | 0.798 |
| C | 8,375 | 5,313/63.4% | 0.55 | 2,500/29.9% | 0.0050 | 1396 | 60 | 0.791 |
| D | 11,313 | 10,625/93.9% | 0.52 | 7,250/64.1% | 0.0044 | 1418 | 60 | 0.778 |
| E | 15,280 | 14,680/96.1% | 0.52 | 12,000/78.5% | 0.0042 | 1439 | 58 | 0.762 |
| F | 16,490 | 9,910/60.1% | 0.59 | 4,172/25.3% | 0.0056 | 1502 | 57 | 0.721 |
| G | 16,478 | 15,967/96.9% | 0.42 | 4,136/25.1% | 0.0048 | 1510 | 64 | 0.788 |
| H | 9,736 | 7,652/78.6% | 0.8 | 4,225/43.4% | 0.0047 | 1416 | 55 | 0.782 |
| I | 13,921 | 13,698/98.4% | 0.4 | 11,387/81.8% | 0.0043 | 1422 | 59 | 0.754 |
| J | 10,521 | 8,911/84.7% | 0.61 | 5,513/52.4% | 0.0070 | 1420 | 55 | 0.782 |
| K | 7,011 | 4,494/64.1% | 0.77 | 1,774/25.3% | 0.0068 | 1331 | 51 | 0.795 |
| L | 6,991 | 4,544/65.0% | 0.74 | 1,762/25.2% | 0.0061 | 1322 | 52 | 0.779 |
| M | 16,200 | 16,038/99.0% | 0.5 | 13,939/86.0% | 0.0041 | 1523 | 43 | 0.758 |
| N | 16,521 | 10,408/63.0% | 0.41 | 4,279/25.9% | 0.0046 | 1478 | 40 | 0.796 |
| O | 14,612 | 12,917/88.4% | 0.43 | 4,647/31.8% | 0.0071 | 1437 | 55 | 0.881 |
| P | 16,490 | 9,861/59.8% | 0.72 | 4,353/26.4% | 0.0059 | 1505 | 63 | 0.828 |
| Q | 7,052 | 4,809/68.2% | 0.74 | 1,756/24.9% | 0.0060 | 1380 | 52 | 0.815 |
| R | 16,500 | 15,691/95.1% | 0.45 | 4,092/24.8% | 0.0059 | 1513 | 66 | 0.845 |
| S | 16,455 | 15,994/97.2% | 0.39 | 14,925/90.7% | 0.0040 | 1484 | 45 | 0.784 |
| T | 12,996 | 12,346/95.0% | 0.81 | 11,437/88% | 0.0046 | 1344 | 56 | 0.785 |

Table 3 above shows, for specimens A through T, measured values of a precipitation behavior of fine precipitates (the number of fine precipitates, a mean distance between the fine precipitates, a diameter of the fine precipitates, and the like) and measured values of characteristics (tensile strength, bendability, and an amount of activated hydrogen) after hot stamping.

greater than or equal to 60% of the fine precipitates formed within the steel sheet has a diameter less than or equal to 0.01 and the number of fine precipitants having the diameter less than or equal to 0.01 μm satisfies greater or equal to 4,500 pieces/100 μm² and less than or equal to 16,000 pieces/100 μm². In addition, greater than or equal to 25% of the fine precipitates formed within the steel sheet has a diameter less than or equal to 0.005 μm.

The specimens A through J of the disclosure satisfying the precipitation behavior conditions as described above have improved tensile strength, bendability, and hydrogen delayed fracture characteristics. In detail, in the specimens A through J, tensile strength satisfied greater than or equal to 1,350 MPa after hot stamping, bendability satisfied greater than or equal to 50° after hot stamping, and an amount of activated hydrogen satisfied less than or equal to 0.8 wppm after hot stamping.

In contrast, specimens K through T are specimens that did not satisfy at least some of the precipitation behavior conditions of the fine precipitates described above and have less tensile strength, bendability, and/or hydrogen delayed fracture characteristic than the specimens A through J.

In the case of the specimen K, the number of fine precipitates having a diameter less than or equal to 0.01 μm is 4,494. This is less than the lower limit of the condition of the number of fine precipitates having a diameter less than or equal to 0.01 μm. Accordingly, the tensile strength of the specimen K was only 1,331 MPa, which is relatively low.

In the case of the specimen L, the number of all fine precipitates is 6,991. This is less than the lower limit of the condition of the number of all fine precipitates. Therefore, the tensile strength of the specimen L was only 1,322 MPa, which is relatively low.

In the case of the specimen M, the number of fine precipitates having a diameter less than or equal to 0.01 μm is 16,038. This exceeds the upper limit of the condition of the number of fine precipitates having a diameter less than or equal to 0.01 μm. Accordingly, the bendability of the specimen M was only 43°, which is relatively low.

In the case of the specimen N, the number of all fine precipitates is 16,521. This exceeds the upper limit of the condition of the number of all fine precipitates. Therefore, the bendability of the specimen N was only 40°, which is relatively low.

In the case of the specimen O, a mean diameter of all fine precipitates is 0.0071 This exceeds the upper limit of a mean diameter condition of all fine precipitates. Accordingly, an amount of activated hydrogen in the specimen O was measured as 0.881 wppm, which is relatively high, and thus, hydrogen delayed fracture characteristics deteriorated relatively.

In the case of the specimen P, a ratio of fine precipitates having a diameter less than or equal to 0.01 μm is 59.8%. This is less than the lower limit a ratio condition of fine precipitates having a diameter less than or equal to 0.005 μm. Accordingly, an amount of activated hydrogen in the specimen P was measured as 0.828 wppm, which is relatively high, and thus, hydrogen delayed fracture characteristics deteriorated relatively.

In the case of the specimen Q, a ratio of fine precipitates having a diameter less than or equal to 0.005 μm is 24.9%. This is less than the lower limit of the ratio condition of the fine precipitates having the diameter less than or equal to 0.005 μm. Therefore, an amount of activated hydrogen in the specimen Q was measured as 0.815 wppm, which is relatively high, and thus, hydrogen delayed fracture characteristics deteriorated relatively.

In the case of the specimen R, a ratio of fine precipitates having a diameter less than or equal to 0.005 μm is 24.8%. This is less than the lower limit of the ratio condition of the fine precipitates having the diameter less than or equal to 0.005 μm. Accordingly, an amount of activated hydrogen in the specimen R was measured as 0.845 wppm, which is relatively high, and thus, hydrogen delayed fracture characteristics deteriorated relatively.

In the case of the specimen S, a mean distance of all fine precipitates is 0.39 This is less than the lower limit of a mean distance condition of all fine precipitates. Accordingly, the bendability of the specimen S was only 45°, which is relatively low.

In the case of the specimen T, a mean distance of all fine precipitates is 0.81 This exceeds the upper limit of the mean distance condition of all fine precipitates. Accordingly, the tensile strength of the specimen T was only 1,344 MPa, which is relatively low.

As a result, a material for hot stamping that was manufactured in a method of manufacturing a material for hot stamping by applying the content conditions and the process conditions of the disclosure described above satisfied the precipitation behavior condition of the fine precipitates described above after hot stamping. A hot stamped product satisfying the precipitation behavior condition of the fine precipitates as described above had improved tensile strength, bendability, and hydrogen delayed fracture characteristics.

It should be understood that exemplary embodiments described herein should be considered in a descriptive sense only and not for purposes of limitation. Descriptions of features or aspects within each exemplary embodiment should typically be considered as available for other similar features or aspects in other embodiments. While one or more exemplary embodiments have been described with reference to the figures, it will be understood by those of ordinary skill in the art that various changes in form and details may be made therein without departing from the spirit and scope of the disclosure as defined by the following claims.

What is claimed is:

1. A material for hot stamping, comprising:
   a steel sheet comprising carbon (C) in an amount of 0.19 wt % to 0.25 wt %, silicon (Si) in an amount of 0.1 wt % to 0.6 wt %, manganese (Mn) in an amount of 0.8 wt % to 1.6 wt %, phosphorus (P) in an amount less than or equal to 0.03 wt %, sulfur(S) in an amount less than or equal to 0.015 wt %, chromium (Cr) in an amount of 0.1 wt % to 0.6 wt %, boron (B) in an amount of 0.001 wt % to 0.005 wt %, an additive in an amount less than or equal to 0.1 wt %, balance iron (Fe), and other inevitable impurities; and
   fine precipitates distributed within the steel sheet,
   wherein the additive comprises at least one of titanium (Ti), niobium (Nb), and vanadium (V),
   wherein the fine precipitates comprise nitride or carbide of at least one of titanium (Ti), niobium (Nb), and vanadium (V) and trap hydrogen,
   wherein an amount greater than or equal to 60% of the fine precipitates is formed to have a diameter less than or equal to 0.01 μm,
   wherein the precipitates are formed in an amount greater than or equal to 7,000 pieces and less than or equal to 16,500 pieces per unit area 100 μm$^2$,
   wherein a tensile strength of the material after hot stamping is greater than or equal to 1,350 Mpa,
   wherein a bendability of the material after hot stamping is greater than or equal to 50°, and
   wherein an amount of activated hydrogen of the material for hot stamping is less than or equal to 0.8 wppm after hot stamping.

2. The material of claim 1, wherein a number of fine precipitates having the diameter less than or equal to 0.01 μm from among the fine precipitates is greater than or equal to 4,500 and less than or equal to 16,000 per unit area 100 μm$^2$.

3. The material of claim 1, wherein an amount greater than or equal to 25% of the fine precipitates is formed to have a diameter less than or equal to 0.005 μm.

4. The material of claim 1, wherein a mean distance between the fine precipitates is greater than or equal to 0.4 μm and less than or equal to 0.8 μm.

5. A method of manufacturing a material for hot stamping, comprising:

reheating a slab within a slab reheating temperature range of 1,200° C. to 1,250° C.;

manufacturing a steel sheet by hot rolling the reheated slab within a finishing delivery temperature range of 840° C. to 920° C.;

coiling the steel sheet within a coiling temperature range of 700° C. to 780° C. and forming fine precipitates within the steel sheet, and uncoiling the steel sheet coiled in the coiling to pickle the steel sheet, and cold rolling the steel sheet at a cold-rolling reduction ratio in a range of greater than or equal to 30% and less than 60%, wherein the slab comprises carbon (C) in an amount of 0.19 wt % to 0.25 wt %, silicon (Si) in an amount of 0.1 wt % to 0.6 wt %, manganese (Mn) in an amount of 0.8 wt % to 1.6 wt %, phosphorus (P) in an amount less than or equal to 0.03 wt %, sulfur(S) in an amount less than or equal to 0.015 wt %, chromium (Cr) in an amount of 0.1 wt % to 0.6 wt %, boron (B) in an amount of 0.001 wt % to 0.005 wt %, an additive in an amount less than or equal to 0.1 wt %, balance iron (Fe), and other inevitable impurities, wherein the additive comprises at least one of titanium (Ti), niobium (Nb), and vanadium (V), wherein the fine precipitates comprise nitride or carbide of at least one of titanium (Ti), niobium (Nb), and vanadium (V), and trap hydrogen, wherein an amount greater than or equal to 60% of the fine precipitates is formed to have a diameter less than or equal to 0.01 μm, wherein the precipitates are formed in an amount greater than or equal to 7,000 pieces and less than or equal to 16,500 pieces per unit area 100 μm$^2$, wherein a tensile strength of the material after hot stamping is greater than or equal to 1,350 Mpa, wherein a bendability of the material after hot stamping is greater than or equal to 50°, and wherein an amount of activated hydrogen of the material for hot stamping is less than or equal to 0.8 wppm after hot stamping.

6. The method of claim 5, wherein a number of fine precipitates having the diameter less than or equal to 0.01 μm from among the fine precipitates is greater than or equal to 4,500 and less than or equal to 16,000 per unit area 100 μm$^2$.

7. The method of claim 5, wherein an amount of greater than or equal to 25% of the fine precipitates is formed to have a diameter less than or equal to 0.005 μm.

8. The method of claim 5, wherein a mean distance between the fine precipitates is greater than or equal to 0.4 μm and less than or equal to 0.8 μm.

9. The method of claim 5, wherein the slab further comprises calcium (Ca).

* * * * *